(12) United States Patent  
Ou

(10) Patent No.: US 7,089,740 B1  
(45) Date of Patent: Aug. 15, 2006

(54) METHOD OF GENERATING POWER FROM NATURALLY OCCURRING HEAT WITHOUT FUELS AND MOTORS USING THE SAME

(75) Inventor: Wen-Show Ou, Kaohsiung (TW)

(73) Assignee: Yi-Lung Phyllis Hsu, Bellevue, WA (US)

( * ) Notice: Subject to any disclaimer, the term of this patent is extended or adjusted under 35 U.S.C. 154(b) by 0 days.

(21) Appl. No.: 11/163,569

(22) Filed: Oct. 23, 2005

Related U.S. Application Data

(63) Continuation-in-part of application No. 11/062,397, filed on Feb. 22, 2005, now abandoned.

(51) Int. Cl.  
*B60K 16/00* (2006.01)

(52) U.S. Cl. .................... 60/641.8; 60/641.15

(58) Field of Classification Search ............ 60/641.8, 60/641.11, 641.12, 615  
See application file for complete search history.

(56) References Cited

U.S. PATENT DOCUMENTS

| | | | | |
|---|---|---|---|---|
| 3,437,076 A | * | 4/1969 | Killebrew | ................... 122/7 R |
| 3,519,065 A | * | 7/1970 | Kitrilakis | ..................... 165/97 |
| 4,191,901 A | * | 3/1980 | Branover | ..................... 310/11 |
| 4,306,414 A | * | 12/1981 | Kuhns | .......................... 60/510 |
| 4,711,095 A | * | 12/1987 | Howland et al. | ............. 62/117 |
| 5,226,477 A | * | 7/1993 | Yuan et al. | ................. 165/169 |
| 5,806,317 A | * | 9/1998 | Kohler et al. | ................. 60/659 |

* cited by examiner

*Primary Examiner*—Hoang Nguyen  
(74) *Attorney, Agent, or Firm*—Pai Patent & Trademark Law Firm; Chao-Chang David Pai

(57) ABSTRACT

A method of generating power is disclosed wherein a liquid having a boiling point near the ambient temperature when it is under atmospheric or moderately higher pressures, preferably propane, isobutane, Freons or ammonia, is placed in a pressure vessel, heat energy is gathered from a naturally occurring heat sources, such as by solar collectors or from hot springs, geothermal or other heat sources, and transmitted through conduction heat pipes to the liquid in the pressure vessel, and the liquid is thereby heated to the boiling point and vaporized. When a liquid is vaporized, its volume expands by several hundred times, creating a pressure sufficient for driving motors. This invention can be used in automobiles, motorcycles, generators, ships, homes, factories, and other suitable places to drive motors, thus reducing the use of petrochemical fuels.

17 Claims, 4 Drawing Sheets

_US 7,089,740 B1_

METHOD OF GENERATING POWER FROM NATURALLY OCCURRING HEAT WITHOUT FUELS AND MOTORS USING THE SAME

CROSS-REFERENCE TO RELATED APPLICATIONS

This application is a continuation-in-part application of prior U.S. application Ser. No. 11/062,397, filed Feb. 22, 2005, which is now abandoned.

BACKGROUND OF THE INVENTION

1. Field of the Invention

This invention relates to a method of generating power from naturally occurring heat energy without consuming fuels, and to the motors using the method. More particularly, this invention relates to a method of generating power by vaporizing a liquid in a pressure vessel using solar energy, geothermal energy or other types of naturally occurring heat energy, wherein the boiling point of the liquid is near the ambient temperature.

2. Description of the Related Art

Power used by humans is mostly derived from combustion of fuels, which exacerbates the greenhouse effect and El Niño, threatening the existence of humans. Therefore, effective utilization of clean energy, such as solar energy, geothermal energy, or energy derived from hot springs or any other suitable heat sources, has been a long-standing goal pursued by many researchers. This invention has arisen from pursuing this goal.

BRIEF SUMMARY OF THE INVENTION

The invention essentially comprises gathering heat energy from naturally occurring heat sources (such as solar energy, geothermal energy, hot springs, or other natural heat-producing sources), quickly transmitting the heat energy through conduction heat pipes to a liquid-vapor two-phase system contained in a pressure vessel, heating the liquid-vapor system to its boiling point to vaporize the liquid and generate a high pressure from volumetric expansion when the liquid is converted to vapor, and applying the high pressure to drive motors. In principle, it works in the same way as steam drives a steam engine. For the present invention to work effectively, the boiling point of the liquid inside the pressure vessel should be near the ambient temperature when it is under atmospheric or moderately higher pressures. The liquid is preferably propane, isobutane, Freons, or ammonia. This invention can be applied in automobiles, motorcycles, generators, ships, homes, factories and other suitable places to drive motors. Thus, the invention can help reduce the consumption of fossil fuels and petrochemicals.

DETAILED DESCRIPTION OF THE PREFERRED EMBODIMENTS

The present invention is described in detail below through two embodiments along with the accompanying drawings.

Figure 1:
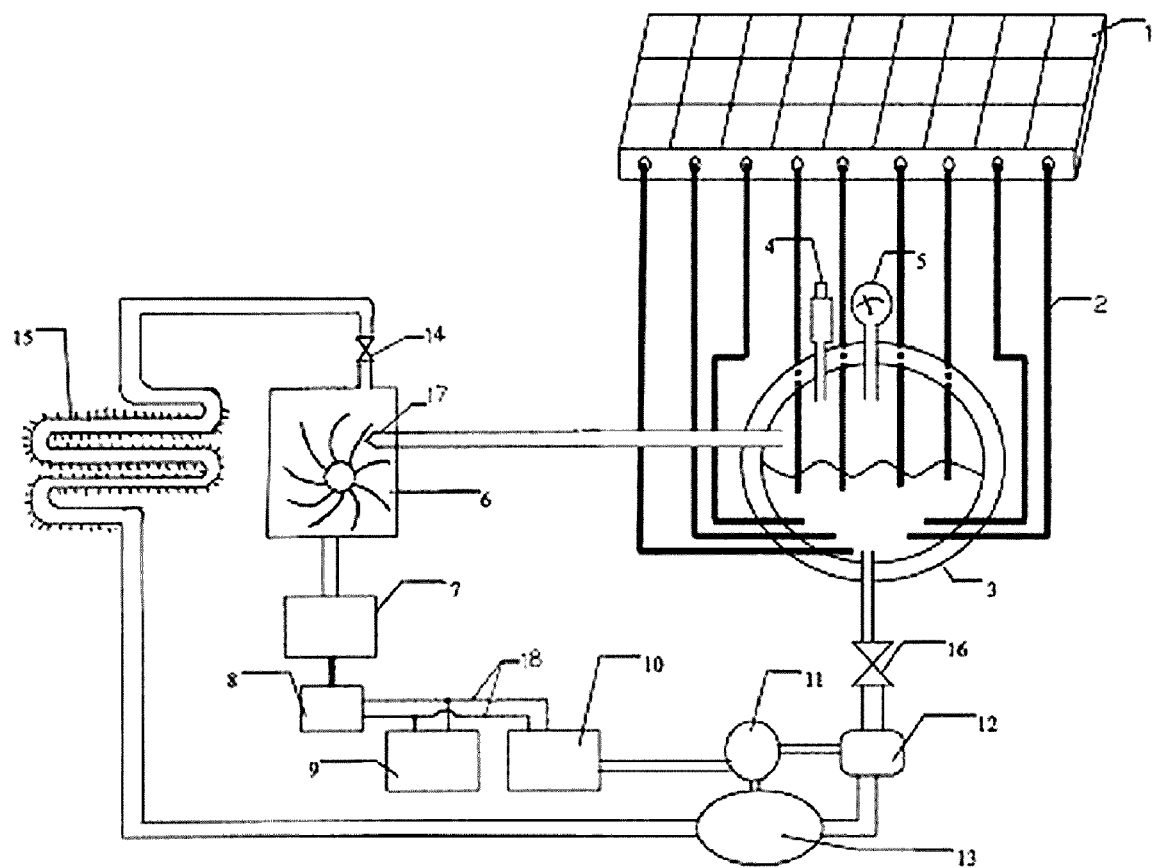
FIG. 1 shows the first embodiment of the present invention, wherein the high-pressure vapor passes through a jet nozzle to drive turbine vanes.

Referring to FIG. 1, this invention uses solar collectors 1 to gather solar heat energy, which is transmitted through conduction heat pipes 2 to a liquid-vapor two-phase system contained in a pressure vessel 3. The pressure vessel 3 is equipped with a safety valve 4 and a pressure gauge 5 for protection from excessive pressure. When the heat transmitted from the solar collectors heats the liquid inside the pressure vessel 3 to its boiling point, the liquid is converted to vapor, expanding the volume by several hundred times and generating a pressure of several hundred atmospheres. Such high pressure is sufficient to drive a motor 6. After driving the motor 6, the vapor at reduced pressure passes through a first check valve 14 and enters a cooler 15; optionally, a fan (not shown) can be installed to enhance the cooling efficiency of the cooler 15; after exiting the cooler 15, the vapor cools down below the boiling point and condenses into liquid, which then enters a reservoir 13 to be pumped by a pump 12 through a second check valve 16 back to the pressure vessel 3, thus completing the cycle. The pump 12 is connected to a liquid level controller 11 for the reservoir 13, and the liquid level controller 11 is connected to a control box 10, which controls the operation of both the pump 12 and the liquid level controller 11.

Besides carrying a load 7, the above-mentioned motor 6 also drives a generator 8. In turn, the generator 8 is connected through wires 18 to a battery 9 and the control box 10. The generator 8 and the battery 9 provide electricity for operating the pump 12 and the control box 10. As shown in FIG. 1, the motor 6 can be powered by allowing the high-pressure vapor passing through a jet nozzle 17 to drive a series of turbine vanes.

Figure 2:
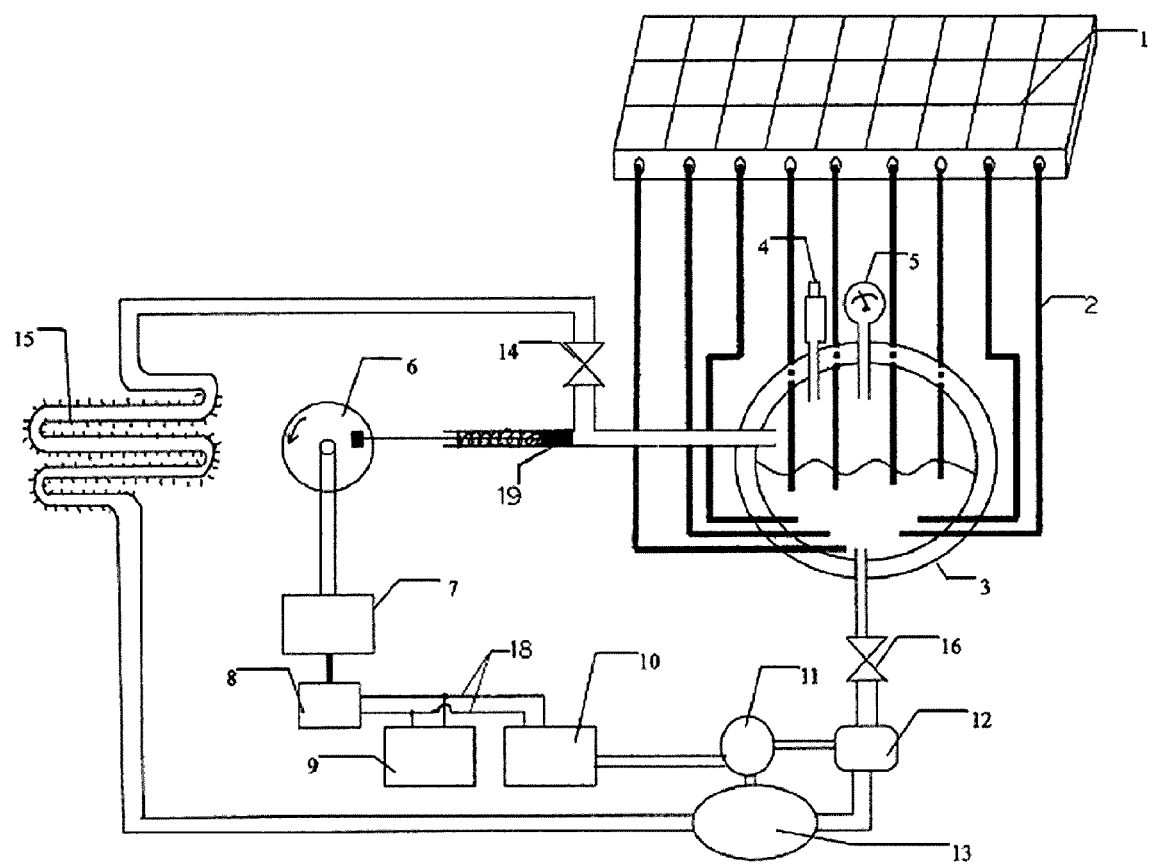
FIG. 2 shows the second embodiment of the present invention, wherein the high-pressure vapor drives a piston connected to a motor.

FIG. 2 illustrates a second embodiment of the present invention. This embodiment is identical to the first embodiment shown in FIG. 1, except that the high-pressure vapor drives a piston 19 to power the motor 6. One should note that other types of driving mechanisms can be used instead.

Figure 3:
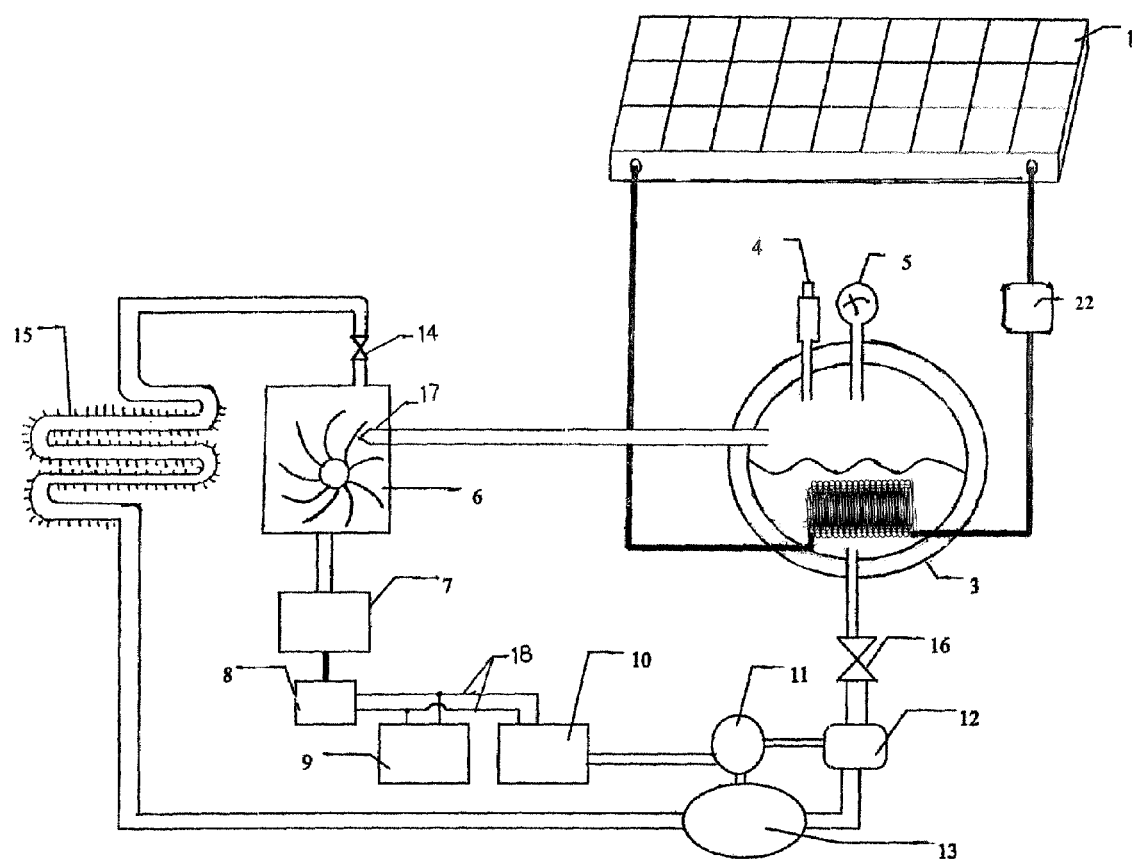
FIG. 3 shows a variant of the first embodiment of the present invention, wherein a pump is used to circulate a heating medium through the solar collectors.

FIG. 3 illustrates a third embodiment of the present invention. This embodiment is identical to the first embodiment shown in FIG. 1, except that the conduction heat pipes are replaced with a pump circulating a heating medium through the solar collectors 1, wherein the heating medium is heated, and through the pressure vessel 3, wherein the heating medium releases its heat to the liquid in the pressure vessel 3 through a coil. Water is used as the heating medium in this embodiment.

Figure 4:
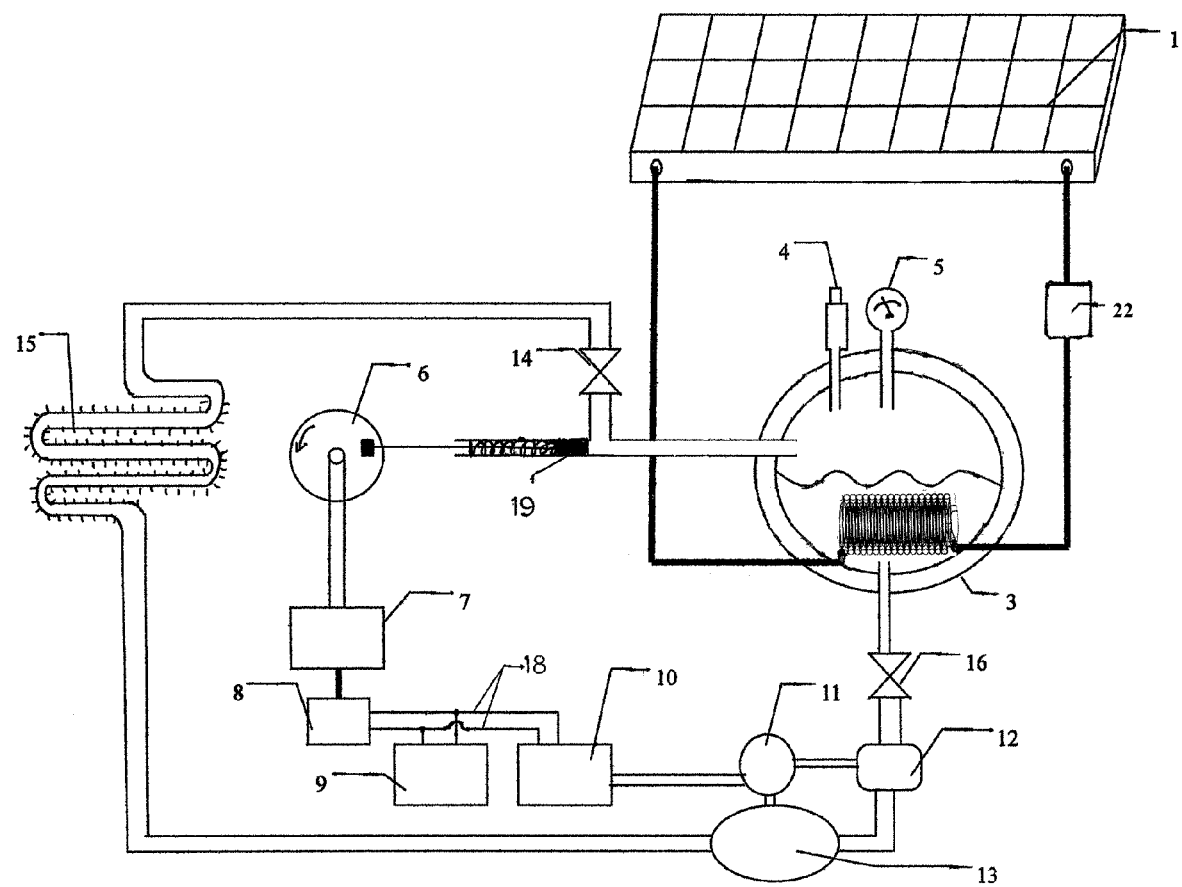
FIG. 4 shows a variant of the second embodiment of the present invention, wherein a pump is used to circulate a heating medium through the solar collectors.

FIG. 4 illustrates a fourth embodiment of the present invention. This embodiment is identical to the second embodiment shown in FIG. 2, except that the conduction heat pipes are replaced with a pump circulating a heating medium through the solar collectors 1, wherein the heating medium is heated, and through the pressure vessel 3, wherein the heating medium releases its heat to the liquid in the pressure vessel 3 through a coil. Water is used as the heating medium in this embodiment.

The above-mentioned generator 8 can also be used for electrolysis of water to produce hydrogen for various applications.

The liquid in the pressure vessel 3 for the present invention is preferably propane, isobutane, Freons (i.e. chlorofluorocarbons with the formula of $CCl_nF_{4-n}$, n=1~3), or ammonia. The operating conditions when propane and ammonia, respectively, is used as the working liquid in the pressure vessel 3 are described in the following examples:

EXAMPLE 1

When propane is used as the working liquid, the temperature and pressure within the pressure vessel 3 are maintained at 45.6° C. and 18.7 kg/cm$^2$, respectively; the pressure of the vapor exiting the first check valve 14 is about 15.5 kg/cm$^2$; and the vapor cools to about 30° C. after the cooler 15.

EXAMPLE 2

When ammonia is used as the working liquid, the temperature and pressure within the pressure vessel 3 are 28.2° C. and 9.67 kg/cm$^2$, respectively; the pressure of the vapor exiting the first check valve 14 is about 6.95 kg/cm$^2$; and the vapor cools to about 7.8° C. after the cooler 15.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A method of generating power from naturally occurring heat sources without fuels, comprising the steps of:
   (a) placing a liquid in a pressure vessel to form a liquid-vapor two-phase system, wherein the boiling point of the liquid is substantially near ambient temperature;
   (b) gathering heat energy from a naturally occurring heat source;
   (c) transmitting the heat energy gathered in step (b) to the liquid-vapor two-phase system to heat it to the boiling point of the liquid to vaporize the liquid and generate a high-pressure vapor;
   (d) using the high-pressure vapor generated in step (c) to drive a motor;
   (e) passing the vapor after driving the motor through a pipe to a cooler;
   (f) cooling the vapor entering the cooler to below the boiling point of the liquid and converting it to liquid;
   (g) passing the liquid from step (f) to a reservoir; and
   (h) returning the liquid from the reservoir through a check valve to the pressure vessel to form a complete cycle using a pump connected to a liquid level controller for the reservoir.

2. The method as claimed in claim 1, wherein
   conduction heat pipes are used in step (c) to transmit the heat energy gathered in step (b) to the liquid-vapor two-phase system; and
   the pressure vessel is equipped with a safety valve and a pressure gauge.

3. The method as claimed in claim 1, wherein the motor is of a piston type or a turbine type.

4. The method as claimed in claim 1, wherein the high-pressure vapor flows through a jet nozzle to drive the motor in step (d).

5. The method as claimed in claim 1, wherein
   the motor drives a generator in addition to a load; and
   the generator is wired to a battery and a control box of the pump for the purpose of controlling the operation of the liquid level controller and the pump.

6. The method as claimed in claim 5, wherein the generator is further used for electrolysis of water to produce hydrogen.

7. The method as claimed in claim 1, wherein solar collectors are used to gather heat energy in step (b).

8. The method as claimed in claim 1, wherein heat energy is gathered from a geothermal energy source in step (b).

9. The method as claimed in claim 1, wherein heat energy is gathered from a hot spring in step (b).

10. A method of generating power from naturally occurring heat sources without fuels, comprising the steps of:
    (a) placing a liquid in a pressure vessel to form a liquid-vapor two-phase system, wherein the liquid is selected from the group consisting of propane, isobutane, Freons and ammonia;
    (b) gathering heat energy from a naturally occurring heat source;
    (c) transmitting the heat energy gathered in stop (b) to the liquid-vapor two-phase system to heat it to the boiling point of the liquid to vaporize the liquid and generate a high-pressure vapor;
    (d) using the high-pressure vapor generated in step (c) to drive a motor;
    (e) passing the vapor after driving the motor through a pipe to a cooler;
    (f) cooling the vapor entering the cooler to below the boiling point of the liquid and converting it to liquid;
    (g) passing the liquid from step (f) to a reservoir; and
    (h) returning the liquid from the reservoir through a check valve to the pressure vessel to form a complete cycle using a pump connected to a liquid level controller for the reservoir.

11. The method as claimed in claim 10, wherein
    conduction heat pipes are used in step (c) to transmit the heat energy gathered in step (b) to the liquid-vapor two-phase system; and
    the pressure vessel is equipped with a safety valve and a pressure gauge.

12. The method as claimed in claim 10, wherein the motor is of a piston type or a turbine type.

13. The method as claimed in claim 10, wherein the high-pressure vapor flows through a jet nozzle to drive the motor in step (d).

14. The method as claimed in claim 10, wherein
    the motor drives a generator in addition to a load; and
    the generator is wired to a battery and a control box of the pump for the purpose of controlling the operation of the liquid level controller and the pump.

15. The method as claimed in claim 14, wherein the generator is further used for electrolysis of water to produce hydrogen.

16. The method as claimed in claim 10, wherein solar collectors are used to gather heat energy in step (b).

17. The method as claimed in claim 16, wherein a pump is used to circulate a heating medium through the solar collectors to gather heat energy in step (b) and through the pressured vessel to transmit the heat energy so gathered to the liquid-vapor two-phase system in step (c).

* * * * *